(12) United States Patent
Hein et al.

(10) Patent No.: US 10,888,084 B2
(45) Date of Patent: Jan. 12, 2021

(54) ULTRASONIC BAT DETERRENT SYSTEM

(71) Applicant: NRG SYSTEMS, INC., Hinesburg, VT (US)

(72) Inventors: Cris Hein, Hillsboro, OR (US); Peter P. Garcia, Jr., Georgetown, TX (US)

(73) Assignee: NRG SYSTEMS, INC., Hinesburg, VT (US)

( * ) Notice: Subject to any disclaimer, the term of this patent is extended or adjusted under 35 U.S.C. 154(b) by 521 days.

(21) Appl. No.: 15/211,916

(22) Filed: Jul. 15, 2016

(65) Prior Publication Data

US 2017/0127664 A1    May 11, 2017

Related U.S. Application Data

(60) Provisional application No. 62/192,895, filed on Jul. 15, 2015.

(51) Int. Cl.
*A01M 29/18* (2011.01)
*F03D 80/80* (2016.01)
(Continued)

(52) U.S. Cl.
CPC ............ *A01M 29/18* (2013.01); *F03D 80/82* (2016.05); *B06B 1/0215* (2013.01);
(Continued)

(58) Field of Classification Search
USPC .......... 119/719, 712, 713; 340/384.2, 573.1, 340/573.2, 573.3; 367/139
See application file for complete search history.

(56) References Cited

U.S. PATENT DOCUMENTS 3,552,382 A * 1/1971 Mount ............... A61B 8/04
                                          600/453
3,872,472 A * 3/1975 Moschgat ........... A01M 29/18
                                          116/137 A
(Continued)

FOREIGN PATENT DOCUMENTS

DE      9312530     10/1993
DE     10051784      8/2002
(Continued)

OTHER PUBLICATIONS

Frontier Wind; "Rotor-Mounted Bat Impact Mitigation System," Wind Energy Technologies Office Peer Review; US Dept of Energy; Feb. 2017; pp. 1-14.
(Continued)

*Primary Examiner* — Andrea M Valenti
(74) *Attorney, Agent, or Firm* — Grossman, Tucker, Perreault & Pfleger, PLLC

(57) ABSTRACT

A bat deterrent system to deter bats from approaching wind turbines may include a first deterrent box having a first and second transducer bank. The first transducer bank may include a first set of transducers located on a first plane and a second set of transducers located on a second plane. The second plane may be different from the first plane. The bat deterrent system may also include a second deterrent box having a third and fourth transducer bank. The third transducer bank may include a third set of transducers located on a third plane and a fourth set of transducers located on a fourth plane. The fourth plane may be different from the third plane. At least one transducer may simultaneously emit a different ultrasonic output waveform than the ultrasonic output waveform emitted from another transducer.

16 Claims, 10 Drawing Sheets

(51) Int. Cl.
*B06B 1/02* (2006.01)
*F16B 7/04* (2006.01)

(52) U.S. Cl.
CPC .......... *B06B 1/0238* (2013.01); *B06B 1/0269* (2013.01); *F16B 7/0486* (2013.01); *Y02E 10/72* (2013.01)

(56) References Cited

U.S. PATENT DOCUMENTS

| | | | |
|---|---|---|---|
| 3,893,106 | A | 7/1975 | Schulein |
| 4,442,715 | A | 4/1984 | Brisken et al. |
| 4,608,993 | A | 9/1986 | Albert |
| 4,616,351 | A | 10/1986 | Hall |
| 5,598,379 | A | 1/1997 | Malleolo |
| 6,166,996 | A * | 12/2000 | Grissom ............... A01M 29/18 367/139 |
| 6,250,255 | B1 | 6/2001 | Lenhardt et al. |
| 6,653,760 | B1 | 11/2003 | Goodson |
| 7,173,534 | B1 | 2/2007 | Markham et al. |
| 8,472,651 | B2 | 6/2013 | Pompei |
| 8,567,131 | B2 | 10/2013 | Ollgaard |
| 8,598,998 | B2 | 12/2013 | Vassilev et al. |
| 8,737,170 | B2 | 5/2014 | Kasper |
| 8,934,650 | B1 | 1/2015 | Norris et al. |
| 8,938,931 | B2 | 1/2015 | Ollgaard |
| 9,125,394 | B2 | 9/2015 | Kinzie et al. |
| 9,217,412 | B2 | 12/2015 | Blake et al. |
| 9,261,081 | B2 | 2/2016 | Ollgaard |
| 9,474,265 | B2 | 10/2016 | Duncan et al. |
| 9,693,548 | B2 | 7/2017 | Swaddle et al. |
| 2002/0047496 | A1 | 4/2002 | Wierach |
| 2003/0058740 | A1 | 3/2003 | Jincks |
| 2004/0195478 | A1* | 10/2004 | Baldasari ............. A63B 63/083 248/218.4 |
| 2005/0085730 | A1 | 4/2005 | Flesch et al. |
| 2005/0162978 | A1 | 7/2005 | Lima |
| 2006/0233049 | A1 | 10/2006 | Cilliers |
| 2009/0034369 | A1 | 2/2009 | Hill |
| 2010/0016727 | A1 | 1/2010 | Rosenberg |
| 2011/0190669 | A1 | 8/2011 | Mi et al. |
| 2011/0215585 | A1 | 9/2011 | Caires |
| 2011/0295123 | A1 | 12/2011 | Feleppa |
| 2013/0050400 | A1 | 2/2013 | Stiesdal et al. |
| 2013/0077446 | A1 | 3/2013 | Kasper |
| 2013/0131495 | A1 | 5/2013 | Konofagou et al. |
| 2013/0239876 | A1 | 9/2013 | Kocker-Kunz |
| 2013/0249693 | A1 | 9/2013 | Neal et al. |
| 2013/0336775 | A1 | 12/2013 | Blake et al. |
| 2014/0144390 | A1 | 5/2014 | Duncan et al. |
| 2014/0169968 | A1 | 6/2014 | Hedeen et al. |
| 2014/0261151 | A1 | 9/2014 | Ronning |
| 2014/0269204 | A1 | 9/2014 | Hajati |
| 2014/0352631 | A1* | 12/2014 | Swaddle ............... A01M 29/18 119/719 |
| 2014/0377061 | A1 | 12/2014 | Caruso et al. |
| 2015/0010399 | A1* | 1/2015 | Bahat ................... A01M 29/08 416/1 |
| 2015/0230450 | A1* | 8/2015 | Norris ................... A01M 29/18 367/139 |
| 2016/0076519 | A1 | 3/2016 | Blake et al. |
| 2016/0366875 | A1 | 12/2016 | Green et al. |
| 2017/0000106 | A1 | 1/2017 | Jones, Jr. |

FOREIGN PATENT DOCUMENTS

| | | |
|---|---|---|
| DE | 102012003495 | 8/2013 |
| DE | 102015224763 | 6/2017 |
| EP | 2818702 | 12/2014 |
| FR | 2342658 | 10/1983 |
| GB | 1517493 | 7/1978 |
| GB | 2166277 | 4/1986 |
| GB | 2211649 | 7/1989 |
| WO | WO8602526 | 5/1986 |
| WO | WO2004093537 | 11/2004 |
| WO | 2011027093 A1 | 3/2011 |
| WO | WO2013144676 | 10/2013 |
| WO | 2017079435 | 5/2017 |
| WO | 2017097478 | 6/2017 |

OTHER PUBLICATIONS

International Search Report and Written Opinion issued in PCT/US2016/060330, dated Jan. 19, 2017, 11 pages.

German Office Action dated May 10, 2019 in corresponding German Patent Application No. 11 2016 005 038.0.

Minoru Toda; "New Type of Matching Layer for Air-Coupled Ultrasonic Transducers"; IEEE Transactions on Ultrasonics, Ferroelectrics, and Frequency Control, vol. 49, No. 7, Jul. 2002; pp. 972-979.

T.E. G. Alvarez-Arenas; "Acoustic Impedance Matching of Piezoelectric Transducers to the Air"; IEEE Transactions on Ultrasonics, Ferroelectrics, and Frequency Control; vol. 51, Issue 5, May 2004; pp. 624-633.

International Search Report and Written Opinion dated Jul. 1, 2019 in PCT Patent Application No. PCT/US2019/026798.

* cited by examiner

ULTRASONIC BAT DETERRENT SYSTEM

PRIORITY CLAIM

This application claims the benefit of U.S. Provisional Patent Application Ser. No. 62/192,895 filed on Jul. 15, 2015, entitled ULTRASONIC BAT DETERRENT SYSTEM, which is fully incorporated in its entirety herein by reference.

TECHNICAL FIELD

The present disclosure relates to deterrent systems and more specifically to ultrasonic deterrent systems for bats.

BACKGROUND OF THE INVENTION

Wind turbines are becoming increasingly popular as a source of renewable energy because of the numerous green initiatives to "clean up the environment" and political and social pressures to provide alternate energy sources other than coal, oil or nuclear power. However, wind turbines are causing other environmental harms in the way of killing bats and flying birds. Further exacerbating the problem are the locations of the wind farms as they are unfortunately located in the range of threatened and endangered bat species. It is not feasible to stop the turbines every time a bat or bats enters into the area. Thus, there is a need for a bat deterrent system that would deter bats from entering into the area where wind turbines are located so they are not killed.

SUMMARY OF THE INVENTION

The inventions described herein provide bat deterrent systems, methods of deterring bats from entering in a wind turbine's rotor-swept zone, and mounting devices for attaching components of the bat deterrent systems to the wind turbine.

Systems comprise a deterrent box comprising more than one transducer that each emits an ultrasonic output. At least one transducer may simultaneously emit a different ultrasonic output waveform than the ultrasonic output waveform emitted from another transducer.

The deterrent box may comprise at least two arrays of transducers wherein each array is located in a different plane. At least one transducer in one plane may simultaneously emits a different ultrasonic output waveform than the ultrasonic output waveform emitted from another transducer in the other plane.

The systems may have more than one deterrent box and they may be positioned to have a different orientation from another deterrent box.

The ultrasonic output waveform maybe white noise continuous, white noise pulsed (fixed), white noise pulsed (randomized), single frequency continuous, single frequency pulsed (fixed), single frequency pulsed (randomized), and frequency sweep.

Bat deterrent systems may comprise a deterrent box comprising more than one transducer that each emits an ultrasonic output, and at least one transducer that simultaneously emits a different frequency than the frequency emitted from another transducer.

Mounting devices for attaching deterrent boxes to a nacelle of a wind turbine may have a horizontal member attached to two vertical members wherein the vertical members attach the device to the wind turbine or are part of the nacelle, and the horizontal member provides support to mount a deterrent box using a bracket and bracket arm and mounting plate. The bracket arm can be adjustable in two axes and then fixed at a desired angle and the mounting plate can be fixed at a desired angle to angle the deterrent box in a desired orientation.

There may also be a side bracket having a side arm for attaching a deterrent box mounted on the vertical member.

Methods of deterring bats from approaching a wind turbine, may use bat deterrent systems described herein to deter the bats from approaching the wind turbine.

DETAILED DESCRIPTION OF THE INVENTION

Figure 1:
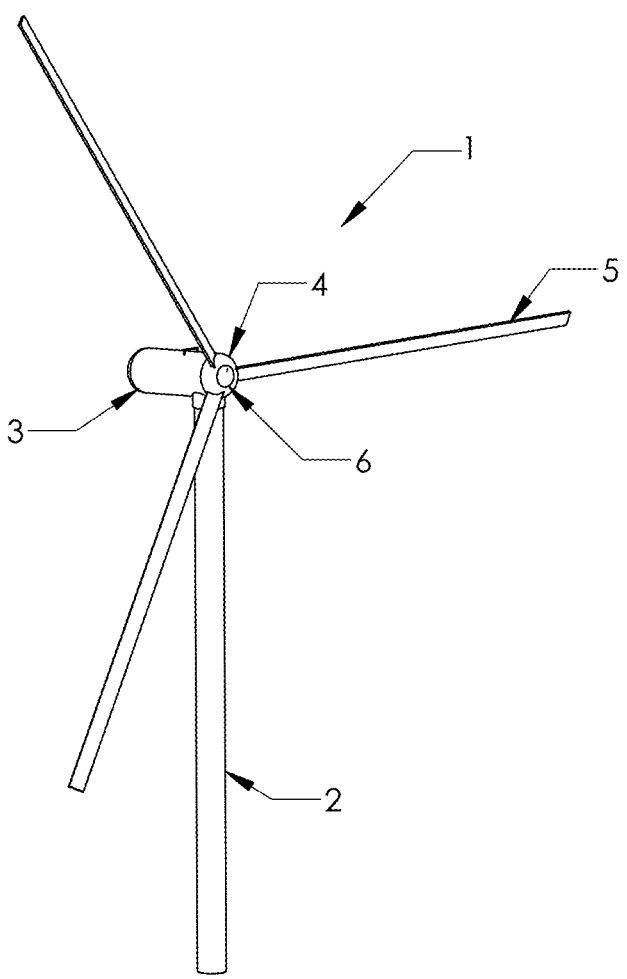
FIG. 1 provides a drawing of a wind turbine.

The systems and methods described herein relate to a bat deterrent system to deter bats from approaching wind turbines. The system is based on ultrasonic transducers placed on the wind turbine that produce ultrasonic sound waves by converting electrical signals into high frequency sound waves. Ultrasound is sound with a frequency greater than the upper limit of human hearing (greater than 20 kHz). Sounds in the range 20-100 kHz are considered ultrasonic and are used by many bat species for communication, navigation and foraging.

The system has more than one transducer and there is in certain embodiments at least two different ultrasonic signals being produced at the same time from the transducers when the system is operational. For example, one transducer would produce ultrasonic signals at one frequency range and another transducer would produce ultrasonic signals at another frequency range. This may be useful because different species of bats use different frequencies to echolocate. Thus, if a wind turbine is in an area occupied by different species of bats, one may wish to have the system deter both species by having two different frequencies. Further, bats of one species can also vary their echolocation signals slightly so they can differentiate their sound from other bats of the same species in the area, so producing different frequency ranges with different transducers may provide a more effective deterrent.

Another type of variation in the ultrasonic signals other than frequency is the output waveform. For example, the ultrasonic output waveform may be, but is not limited to, white noise continuous, white noise pulsed (fixed), white noise pulsed (randomized), single frequency continuous, single frequency pulsed (fixed), single frequency pulsed (randomized), and frequency sweep.

In the White-Noise Continuous mode of ultrasonic transmission, the output is a continuous broadcast of randomized frequencies between a user-defined lower (such as a min. 10 kHz) and upper (such as a max. 100 kHz) limit. This mode is intended to broadcast an output with a flat response across the desired frequency range, with any attenuation due to the transducers' inherent resonant frequency and frequency response.

In White-Noise Pulsed (Fixed) mode of ultrasonic transmission, the output is a pulsed broadcast of randomized frequencies between a user-defined lower (such as a min. 10 kHz) and upper (such as a max. 100 kHz) limit. Each "on" pulse has a user-defined length (such as 0.2 to 500 ms). During this "on" pulse, the deterrent box (DB) is broadcasting white noise. Each "off" period has a user-defined length (such as 5 to 500 ms). During this "off" pulse, nothing is broadcast.

In the White-Noise Pulsed (Randomized) mode of ultrasonic transmission, the output is a pulsed broadcast of randomized frequencies between a user-defined lower (such as a min. 10 kHz) and upper (such as a max. 100 kHz) limit. Each "on" pulse has a randomized length (such as 0.2 to 500 ms). During this "on" pulse, the DB is broadcasting white noise. Each "off" period has a randomized length (such as 5 to 500 ms). During this "off" pulse, nothing is broadcast.

In the Single Frequency Continuous mode of ultrasonic transmission, the output is a continuous broadcast of a single user-defined frequency (such as 10 to 100 kHz at approximately 1 kHz intervals). This mode is intended to broadcast an output at the desired frequency, increasing the output of the transducers at that frequency when compared to white noise.

In the Single Frequency Pulsed (Fixed) mode of ultrasonic transmission, the output is a pulsed broadcast of a single user-defined frequency (such as 10 to 100 kHz at approximately 1 kHz intervals). Each "on" pulse has a user-defined length (such as 0.2 to 500 ms). During this "on" pulse, the DB is broadcasting at the user-defined frequency. Each "off" period has a user-defined length (such as 5 to 100 ms). During this "off" pulse, nothing is broadcast.

In the Single Frequency Pulsed (Randomized) mode of ultrasonic transmission, the output is a pulsed broadcast of a single user-defined frequency (such as 10 to 100 kHz at approximately 1 kHz intervals). Each "on" pulse has a randomized length (such as 0.2 to 500 ms). During this "on" pulse, the DB is broadcasting at the user-defined frequency. Each "off" period has a randomized length (such as 5 to 100 ms). During this "off" pulse, nothing is broadcast.

In the Frequency Sweep mode of ultrasonic transmission, the output is a continuous broadcast at a single frequency at a time, sweeping from low (such as 10 kHz) to high (such as 100 kHz) at 10 kHz intervals (for example). The duration that the output stays at each frequency is a user-defined length (such as 0.2 to 500 ms). This mode is intended to broadcast at multiple frequencies, while increasing the output at each frequency when compared to white noise.

Although the above descriptions of the mode of transmission (or referred to herein as output waveform) includes frequency ranges, frequency minimums and maximums, and frequency and time intervals, it is to be understood that these are exemplary and can be altered depending on the need.

Thus, as a non-limiting example, one transducer could produce a white noise continuous waveform, while another transducer could produce a fixed white noise pulsed waveform. In certain embodiments, there could be transducers producing different frequencies and transducers producing different waveforms, or there could be mixture of different frequencies and waveforms. For example some transducers could produce different frequencies and some could produce different waveforms. As a non-limiting example, one transducer could produce a white noise continuous waveform at one frequency range and another transducer could produce a fixed white noise pulsed waveform at a different frequency range. In addition, the transducers could be controlled so that they change their frequency and/or output waveform during the operation. For example, at one point in time during the operation, a transducer produces one waveform or frequency range, but then at another point in time, it produces a different waveform or frequency. By having the ability to alter the waveform and/or frequencies of the individual transducers, a system that has many transducers placed at different locations on the wind turbine could produce a multitude of different frequencies and waveforms and could switch throughout the operation so that the system is a dynamic system.

A benefit of having a dynamic system is to prevent any potential habituation by bats to the presence of ultrasound emissions and acoustic deterrents over time. Having a dynamic system that has the ability to change its emissions makes it more difficult for the bats to become accustomed to it.

In some embodiments, all of the transducers emit the same output waveform and the same frequency range. In some embodiments all of the transducers emit the same output waveform but at least one emits a different frequency range from another transducer. In some embodiments all of the transducers emit within the same frequency range, but emit a different output waveform.

The transducers may be positioned anywhere on the wind turbine including the nacelle, rotor, rotor hub, support post (tower), or rotor blades. FIG. 1 provides an exemplary wind turbine 1 with a support post or tower 2, a nacelle 3, a rotor 4, rotor blades 5, and a rotor hub 6. The deterrent boxes may be placed on the nacelle for ease of installation. They can also be positioned so that they project their ultrasonic emissions in a different trajectory than another transducer in the system. The transducers are preferably positioned to provide the best broadcast coverage of the ultrasonic emissions. In other words, the emissions need to broadcast out far enough and the combination of transducers need to have a wide enough coverage range to effectively deter bats from entering into the rotor-swept zone of the wind turbine. The rotor-swept zone is the area where bats can be harmed from the wind turbine, including being struck by one of the blades, but also including the area where the air disruptions caused by the rotor blade movement can potentially harm the bat's lungs, other organs or blood vessels, and auditory system (e.g., ear drums). The emissions need to extend far and wide enough so that the bats are deterred so they can make a course correction during flight so as to avoid flying into the rotor-swept area. One goal for bat deterrent system ultrasonic emissions is to achieve a 122 dB output at a 1 meter distance with a 50 kHz signal. Achieving an effective range in the deterrent emissions depends upon humidity, temperature, wind speed and barometric pressure.

In some cases the transducers are placed on the nacelle of the wind turbine. To achieve different trajectories of emissions, the transducers can be placed so they point in different directions from other transducers, such as, but not limited to, up towards the sky, down towards the ground, toward the front of the wind turbine, towards the back of the wind turbine (leeward side) or any variation in between. In some instances, in addition to, or instead of angling the transducers in different orientations, reflectors can be used on the transducers to direct the trajectory of the emissions in a desired direction.

The system may have the transducers in a box that protects the transducers from the environment and group some of the transducers in the system together. The deterrent box may have more than one transducer. The system may have more than one deterrent box containing at least one transducer. The deterrent boxes can be positioned in any position on the wind turbine, as similarly described above with respect to the location of the transducers. A goal is to have the deterrent boxes placed to provide optimum broadcasting of the ultrasonic emissions. The ultrasonic emissions need to broadcast out far enough and have a wide enough range to effectively deter bats from entering into the wind turbine rotor-swept zone.

Figure 2:
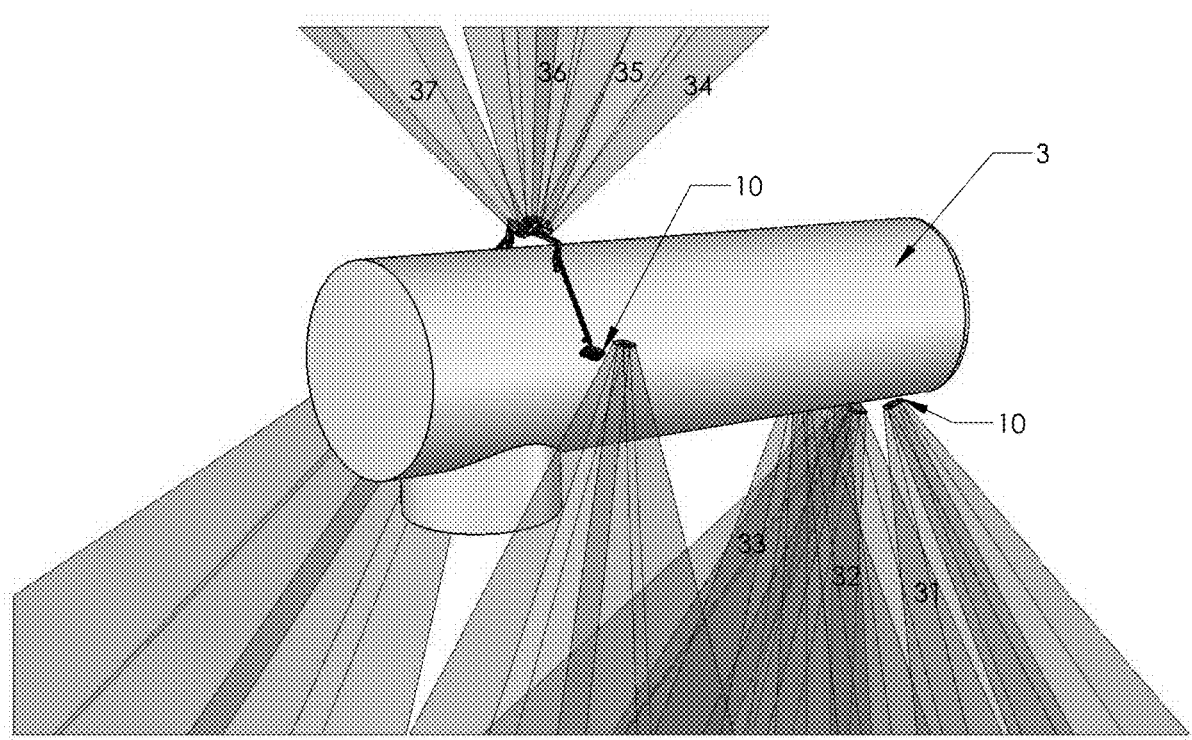
FIG. 2 provides a depiction of deterrent boxes mounted on a nacelle in different locations with different orientations to provide different trajectories for the ultrasonic emissions.
Figure 3:
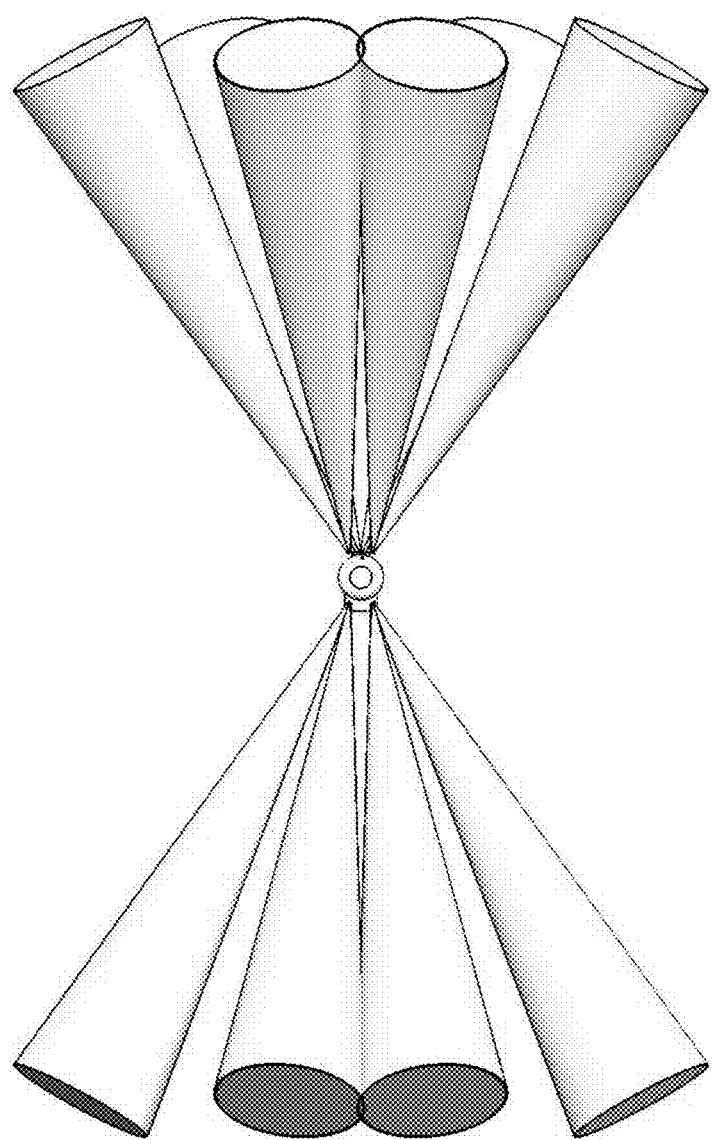
FIG. 3 provides a front facing view (facing the rotor hub) of a bat deterrent system showing different trajectories of various ultrasonic emissions.
Figure 4:
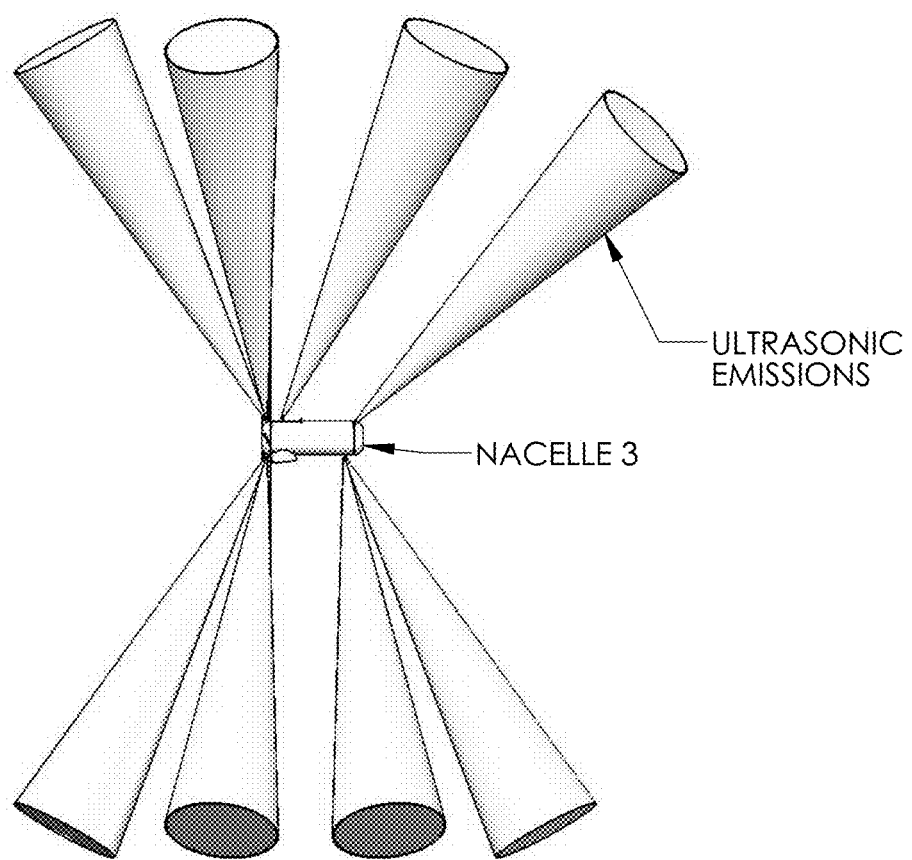
FIG. 4 provides a side view showing the rotor-swept zone and nacelle and different trajectories of various ultrasonic emissions.
Figure 8:
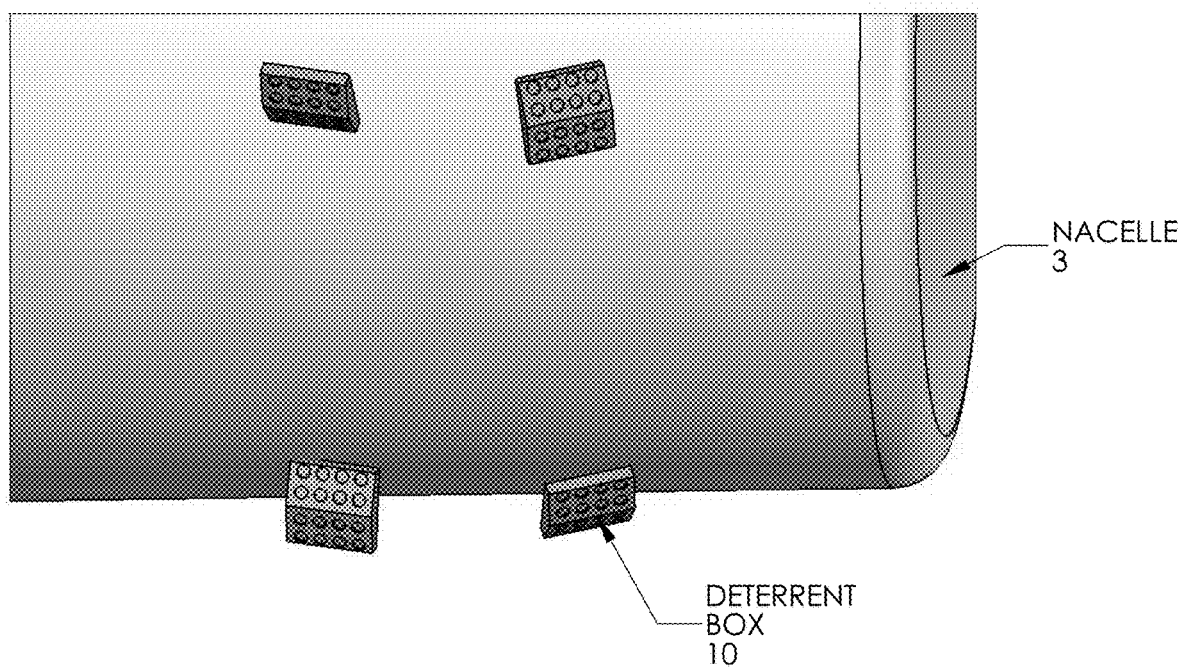
FIG. 8 provides a figure showing four deterrent boxes positioned in different orientations and different locations on the bottom of a nacelle.

In some cases the DBs are placed on any part of the wind turbine, including the nacelle, rotor, rotor hub, support post, or rotor blades of the wind turbine. In some embodiments, the DBs are placed on the nacelle. One or some deterrent boxes can be pointed up towards the sky, one or some deterrent boxes can be pointed down towards the ground, one or some deterrent boxes can be pointed toward the front of the wind turbine and one or some deterrent boxes can be pointed towards the back, or in any other variation of direction. See FIG. 2, which provides a depiction of deterrent boxes 10 mounted on a nacelle 3 with different orientations to provide different trajectories (31-37) for the ultrasonic emissions. See also FIGS. 3-4 for additional depictions of trajectories. See also FIG. 8 showing deterrent boxes mounted with different orientations with respect to each other.

In some instances, instead of arranging the boxes in different orientations, reflectors can be used to direct the ultrasonic emissions in the direction desired. In some cases, the system uses a combination of altering the orientation of the boxes as well as using reflectors to achieve the desired emission trajectory array.

In some instances it may be desirable to mount a couple of deterrent boxes in the same orientation and in some instances right next to each other to bolster the strength of the ultimate signal.

Figure 6:
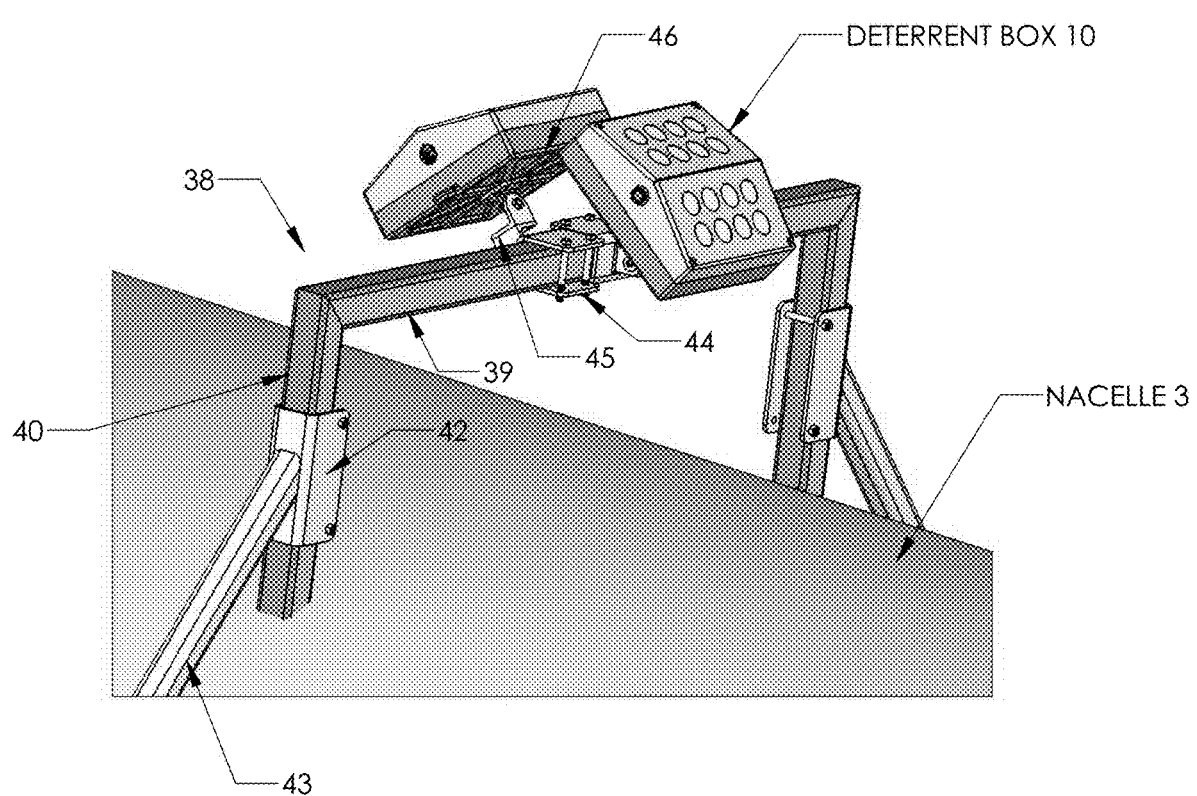
FIG. 6 provides an exemplary bracket design for mounting a deterrent box on a nacelle.

As for mounting the deterrent boxes onto the wind turbine, any suitable mounting device may be used. The invention provides a mounting apparatus. FIG. 6 depicts an example mounting apparatus 38 that comprises a horizontal member 39 and two vertical members 40, the vertical members attach the device to the wind turbine. The vertical member may further comprise a side bracket 42 with a side arm 43 for attaching a deterrent box. In some instances, the horizontal and vertical members are part of the nacelle and in some instances they are not part of the nacelle and are provided by the mounting device. The horizontal member 39 is used to provide a support to mount a deterrent box 10, using a bracket 44 and bracket arm 45, which can be adjusted in two axes, and mounting plate 46. Multiple deterrent boxes can be installed on the horizontal member 39. The deterrent box is attached to the mounting plate. Depending on the configuration of the nacelle, in some wind turbines, the mounting apparatus would be attached on the top of the nacelle between the bay doors and the rotor. A combination of the angle of the bracket arm 45 and the angle of the mounting plate 46 provides the ability to angle the deterrent box in a desired orientation.

Figure 7:
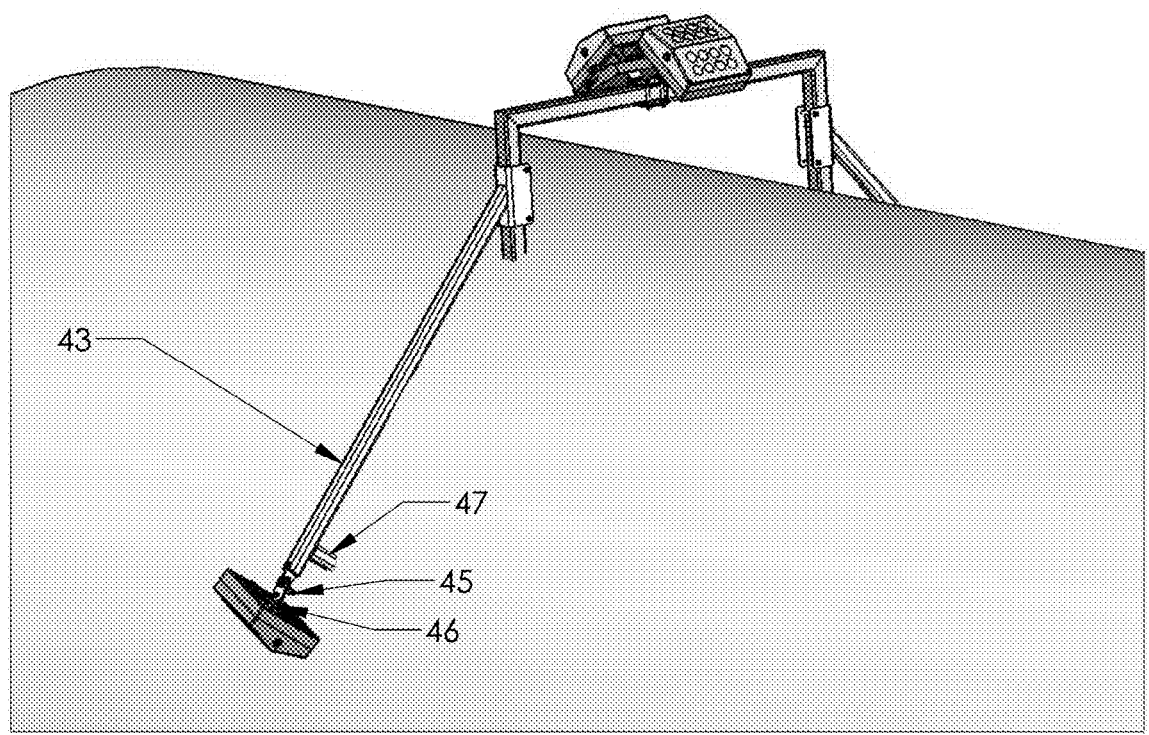
FIG. 7 provides another view of a bracket design for mounting a deterrent box on a nacelle.

FIG. 7 provides a drawing of the mounting apparatus 30 with a deterrent box mounted off of the side with a side arm 43, bracket arm 45 and mounting plate 46. In addition supplementary support 47 is shown to provide additional support for the side arm 43.

Figure 5A:
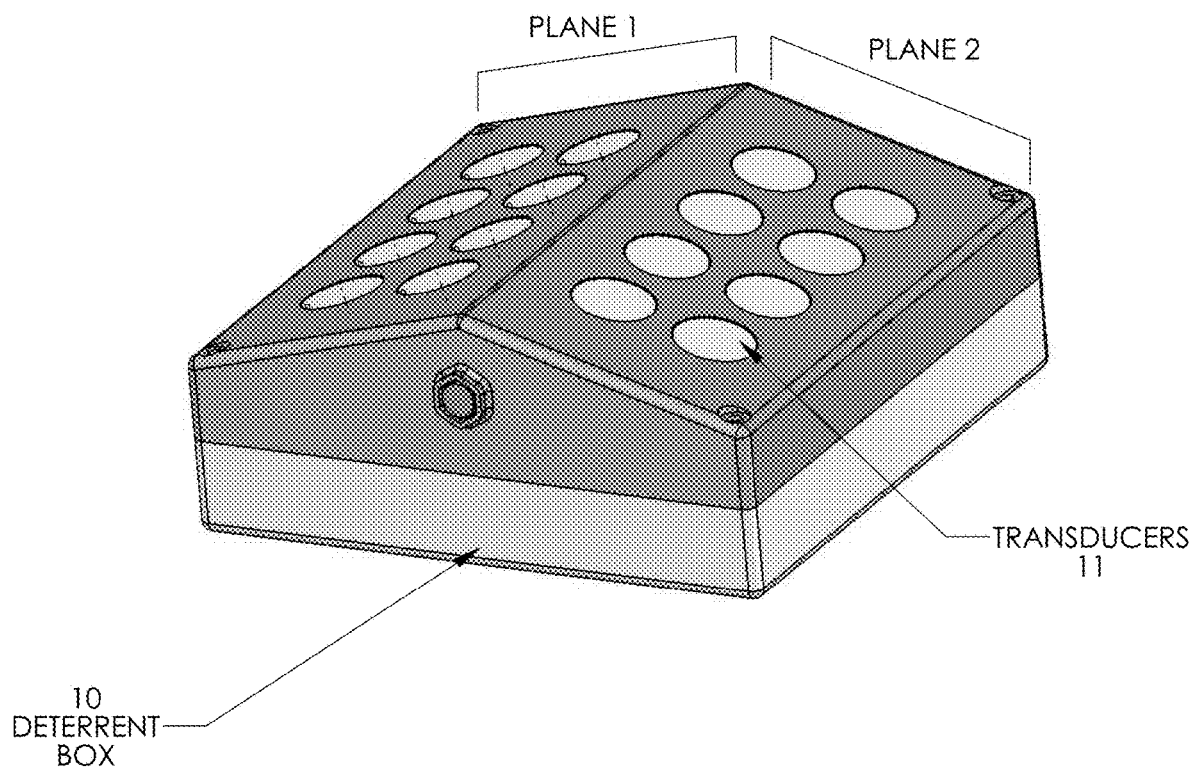
FIG. 5A shows a deterrent box having a "roof top" structure. There is an array of 2×4 transducers (two rows of four transducers) located in one plane and another array of 2×4 transducers located in a different plane.
Figure 5B:
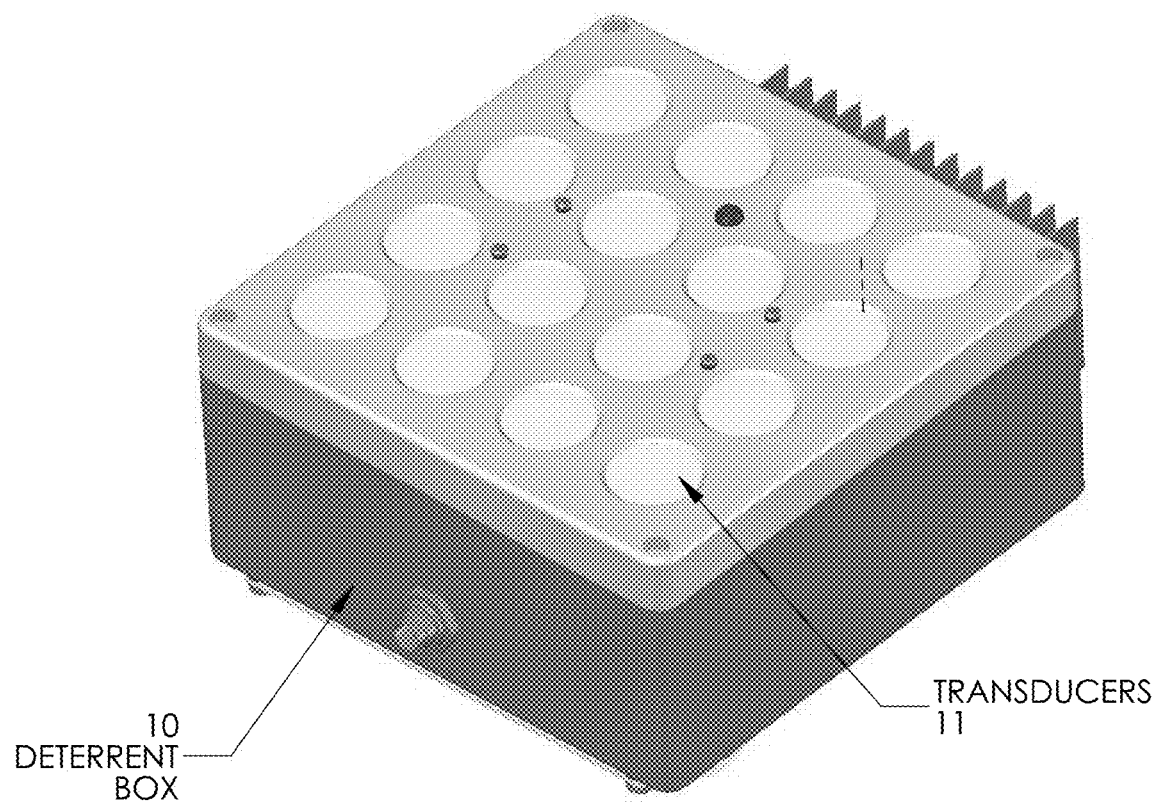
FIG. 5B shows a deterrent box having an array of 4×4 transducers (four banks/rows of four transducers). It also shows that the transducers are located in the same plane.

The deterrent box may contain more than one transducer and the transducers can be orientated in different directions inside the box. The transducers in one deterrent box can be all oriented in the same direction and the different trajectory of emissions for the system can be achieved by the orientating different deterrent boxes in different directions. Or, reflectors could be used to direct the ultrasonic emissions in the desired trajectories. The deterrent box may be designed so that the transducers are in different planes within the deterrent box. FIG. 5A is exemplary as it shows a deterrent box having an array of 4×4 transducers, four banks of four transducers. It also shows that the transducers are located in different planes (plane 1 and plane 2). An array of 2×4 transducers is located in one plane and another array of 2×4 transducers is located in a different plane. FIG. 5B shows a deterrent box with all of the transducers in one plane.

Because the system can have different orientations for the deterrent boxes when mounted on the wind turbine, can have deterrent boxes with more than one plane, and also have the transducers in the deterrent box orientated so they broadcast in different trajectories from the other transducers, if desired, the system can provide a seemingly infinite number of ultrasonic trajectories so as to provide a system with the desired range of emissions (for example, a certain distance from the wind turbine in all directions and desired loudness of emissions). In other words the emissions can be broadcast far enough in all directions so bats approaching from above or below or from either side of the blades will detect the deterrent ultrasonic emissions in time to change their flight direction and avoid entering into the rotor-swept zone.

As discussed above, when the system contains more than one transducer, each transducer or each group of transducers may emit a different signal than another transducer or group of transducers. A deterrent box may contain a grouping of transducers all emitting the same signal or emitting a variety of different signals. "Emitting a signal" means emitting an ultrasonic emission and "emitting a different signal" means that either the frequency of emission varies or the output waveform varies (e.g. white noise continuous, white noise pulsed (fixed), white noise pulsed (randomized), single frequency continuous, single frequency pulsed (fixed), single frequency pulsed (randomized), and frequency sweep).

In one embodiment a bat deterrent system has 8 deterrent boxes, where each deterrent box has 16 transducers. Some of the deterrent boxes are pointed up and some are pointed down when mounted. The 16 transducers are positioned within the deterrent boxes that have two different planes, each plane having a 2×4 matrix (two rows of four transducers).

In some systems each bank of four transducers can simultaneously emit an ultrasonic output waveform different from the other banks of transducers. In some embodiments, all of the transducers emit the same output waveform.

Figure 9:
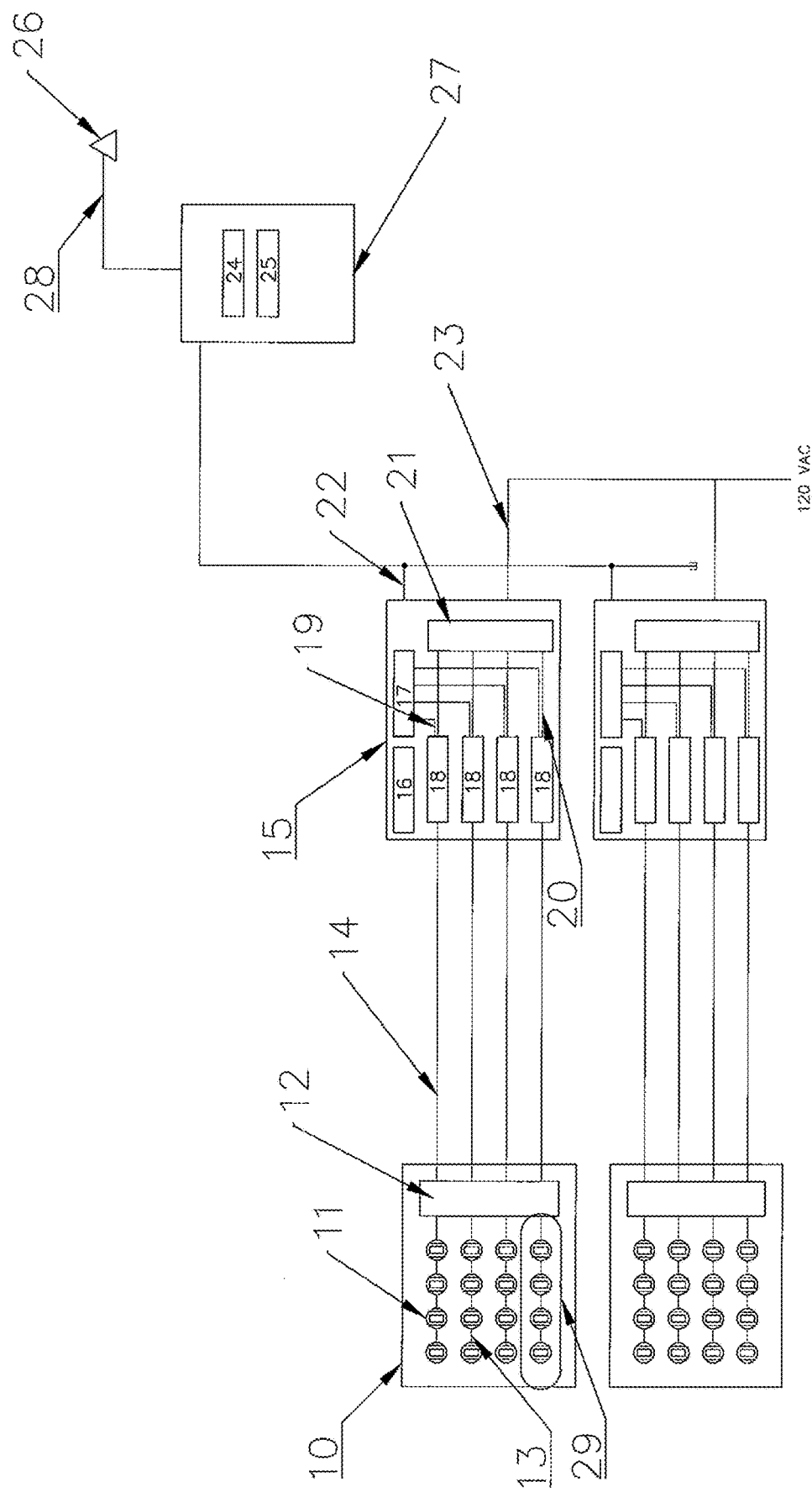
FIG. 9 provides a diagram of a bat deterrent system having a deterrent box(es) containing ultrasonic transducers, amplifier module(s) and a master controller.

Bat deterrent systems of the invention may comprise a deterrent box containing transducers and an interface board; a master controller containing a master processor and a power supply; an amplifier module containing amplifier circuits, a processor and a high voltage and low voltage power supply. Referring to FIG. 9, deterrent box 10 comprising transducers 11 are connected with cables 13 (or could be soldered directly to a printed circuit board ("PCB")) to an interface board 12. The interface board 12 is connected to amplified circuits 18 within an amplifier module 15 with cables 14. The interface board takes four sets of output signals (one from each amplifier circuit) and distributes each set of output signals to four transducers. It also has resettable circuit protection to protect the transducers and the wires from over-temperature or overcurrent. In the amplifier module 15 there is a processor 17 connected to the amplified circuits 18 with cable 19; and a high voltage power supply 21 connected to the amplified circuits 18 with cable 20. Although the figure shows cables, the processor and the amplifier circuits can be mounted to the PCB with no cables or wires—that is they are connected via the wire trace connections on the PCB. The processor is connected to the low voltage Power Supply. The low voltage power supply maybe connected with a cable or wires or it might be mounted directed to the PCB. The processor may or may not be connected directly to the high voltage power supply but it will nonetheless control the output of the high voltage power supply (i.e. turn the high voltage power supply on and off). As shown, in certain embodiments, each bank 29 of transducers 11 is connected to a unique amplified circuit so that each bank of transducers is independently controlled by its own amplified circuit 18, which allows, if desired, each bank of transducers to emit a different frequency or output waveform from another bank of transducers located in the same deterrent box 10 or even to power off or on a certain bank of transducers. Having a separate amplifier circuit allows for individual monitoring of each bank of transducers. Further, since each deterrent box 10 is connected to its own amplifier module 15, each deterrent box can be separately monitored or directed on operation parameters (e.g. which frequency (or range) and/or which waveform output to broadcast, or whether to be powered on or off, etc.). Further, this overall configuration provides the ability to monitor each bank of transducers as well as each deterrent box independently of each other.

An amplifier module 15 is connected to each deterrent box 10 with a multi-conductor cable 14. Each amplifier module 15 includes at least one amplified circuit 18, one for each bank of transducers 29. The amplified circuit 18 is connected to a processor 17 to generate driving signals as well as monitor performance. During ultrasonic transmission the amplifier module 15 measures the current draw for each bank of transducers. For example the actual current draw can be compared to expected levels to determine how many transducers are functioning as expected. In some systems there may be an ultrasonic microphone or ultrasonic receiver to monitor whether the transducers are functioning. The amplifier module 15 is connected to the master controller 27 and communicates with the master controller 27 via a communications bus 22. A communications bus provides the ability to daisy-chain all the amplifier modules together. The master controller 27 contains a master processor 24 and an AC/DC power supply 25. In certain designs each transducer in a bank plugs into the interface PCB where they are connected to the same amplifier output signal. There are resettable fuses that protect each pair of transducers. They are not linked directly by cables. They are linked by a combination of cables/wires, resettable fuses, and PCB traces. The transducers 11 in each panel 29 are linked together with cable 13. Cables 23 are shown connected to 120 VAC power source. Any power source is suitable as long as it provides sufficient power.

The master controller provides external communication interfaces to the deterrent system. The master controller 27 is connected to each amplifier module 15 for providing configuration parameters and monitoring performance values. The master controller logs feedback from the processor 17, provides remote monitoring of the system, and provides remote control of the system. The processor may contain an Ethernet interface 28 for remote monitoring/control of the system. For example, frequency ranges and output waveforms can be chosen and controlled remotely. In addition deterrent box on/off control, system on/off, transducer bank on/off, start/stop times, clock/time control, data download and firmware uploads, etc. can be remotely controlled. The master controller communicates any remote control changes to the amplifier modules. In addition, the processor 24 in the master controller monitors performance of each deterrent box.

To provide protection from the elements, the system components (the amplifier modules and master controller) other than the deterrent box, can be located inside the nacelle of the wind turbine.

Bat deterrent systems may also contain heat sinks and forced air cooling to protect the system from excessive heat buildup.

The amplifier module can monitor various parameters such as the heat sink temperature, transducer bank output waveform type, transducer bank status, or error status. The master controller monitors ambient temperature or error status. The master controller logs the data from itself and the amplifier modules.

The system has at least three non-operational modes: diagnostic mode, idle mode, boot-load mode. The master controller controls which operational or non-operational mode the system is in. In the Diagnostic Mode, the amplifier module generates an output waveform (or a set of waveforms) and verifies that the current draw for each bank of transducers is within the expected range. The purpose of Diagnostic Mode is to identify any transducers that are not functioning as expected. The Diagnostic Mode can also be used to set the expected current draw for each bank of transducers. The master controller places an amplifier module in Diagnostic Mode when commanded via remote control, or when poor performance is suspected.

When no output waveforms are being generated, but power is applied, the system is in Idle Mode. In Idle Mode, remote monitoring is still enabled, and the master controller waits for commands through the remote interface and/or waits to start operation again based on a configured timer.

In Boot-load Mode, firmware updates for the master controller or amplifier modules may be uploaded and installed remotely or locally via the Ethernet interface.

Bat deterrent systems provided herein may also contain software. Software features include initialization, built-in test, remote connection/monitoring/control, data logging, configuration management, real-time clock and calendar, idle mode, diagnostic mode, boot-load mode, transmission mode (defines various output waveforms), and shutdown.

The interface can include Ethernet for remote control monitoring, CAN (for internal distributed controls) (or other suitable communications protocols), and SD RAM (for local data storage) (or other suitable memory storage methods).

The following example embodiments are for the purposes of illustration only and are not to be construed as limiting.

One example of a bat deterrent system to deter bats from approaching wind turbines may include a first deterrent box having a first and second transducer bank. The first transducer bank may include a first set of transducers to emit a first ultrasonic output and the second transducer bank may include a second set of transducers to emit a second ultrasonic output. The first set of transducers may be located on a first plane and the second set of transducers may be located on a second plane. The second plane may be different from the first plane. The bat deterrent system may also include a second deterrent box having a third and fourth transducer bank. The third transducer bank may include a third set of transducers to emit a third ultrasonic output and the fourth transducer bank may include a fourth set of transducers to emit a fourth ultrasonic output. The third set of transducers may be located on a third plane and the fourth set of transducers may be located on a fourth plane. The fourth plane may be different from the third plane. In some embodiments at least one transducer may simultaneously emit a different ultrasonic output waveform than the ultrasonic output waveform emitted from another transducer.

In embodiments, the first deterrent box may be positioned at a different orientation from the second deterrent box. In some embodiments, the first deterrent box may simultaneously generate a different ultrasonic output waveform than the second deterrent box. In some embodiments, at least one of the first and third transducer banks may simultaneously generate a different ultrasonic output waveform than the second and fourth transducer banks, respectively. In embodiments, the ultrasonic output waveform may be selected from the group consisting of white noise continuous, white noise pulsed (fixed), white noise pulsed (randomized), single frequency continuous, single frequency pulsed (fixed), single frequency pulsed (randomized), and frequency sweep. In some embodiments, the first set of transducers may include four transducers and the first deterrent box may further include an additional transducer bank including an additional set of four transducers, wherein the additional transducer bank may be located on the first plane such that a 2×4 array of transducers is formed.

One example of a mounting device for attaching deterrent boxes comprising ultrasonic transducers to a nacelle of a wind turbine may include a horizontal member and at least one vertical member having a first end coupled to the horizontal member and a second end to be coupled to the nacelle of the wind turbine. A bracket may be coupled to the horizontal member. The bracket may include a bracket arm that is adjustable in at least two axis. A mounting plate may be coupled to the bracket arm. The mounting plate may receive a bat deterrent box, wherein adjusting the bracket arm may adjust an orientation of the mounting plate.

In embodiments, the mounting device may also include a side bracket having a side arm for attaching a deterrent box mounted on the vertical member. In some embodiments, the mounting device may also include a supplementary support having a first end coupled to the side arm and a second end to be coupled to the nacelle of the wind turbine.

One example of a bat deterrent system may include a plurality of bat deterrent boxes. Each bat deterrent box may include a plurality of transducers for emitting an ultrasonic output, an amplifier electrically coupled to each of the plurality of transducers, and a processor electrically coupled to the amplifier. The processor may generate signals to cause each of the plurality of transducers to be driven. The bat deterrent system may also include a master controller in communication with each processor. The master controller may log one or more parameters for each of the plurality of bat deterrent boxes.

In embodiments, each of the plurality of transducers may form at least one transducer bank. In some embodiments, the one or more parameters may be received from the processor. In embodiments, the one or more parameters may be selected from the group consisting of a heat sink temperature, an output waveform type, a transducer bank status, and an error status. In some embodiments, the master controller may monitor at least one of an ambient temperature or an error status. In embodiments, the master controller may be connected to a network. In some embodiments, the master controller may receive one or more control instructions from the network. In embodiments, the one or more control instructions may be selected from the group consisting of a deterrent box on/off instruction, a system on/off instruction, a transducer bank on/off instruction, and a start/stop instruction. In some embodiments, the master controller may communicate the one or more control instructions to at least one of the processors. In embodiments, the master controller may receive a firmware update from the network.

While the principals of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A bat deterrent system to deter bats from approaching wind turbines, the system comprising:
   a first transducer bank, a second transducer bank, a third transducer bank and a fourth transducer bank coupled to the wind turbine, wherein the first transducer bank comprises a first set of transducers each configured to emit a first frequency, the second transducer bank comprises a second set of transducers each configured to emit a second frequency;
   the third transducer bank comprises a third set of transducers each configured to emit a third frequency and the fourth transducer bank comprises a fourth set of transducers each configured to emit a fourth frequency, wherein the first, second, third and fourth frequencies are different ultrasonic frequencies; an amplifier module comprising
   a plurality of separate amplified circuits, each of the separate amplified circuits coupled to a different associated one of the first, second, third and fourth transducer banks,
   a processor coupled to the plurality of separate amplified circuits and configured to separately drive the first, second, third and fourth transducer banks to simultaneously emit the first, second, third and fourth frequencies, respectively, and to measure the actual current draw for each of the first, second, third and fourth banks of transducers and compare the actual current draw to expected levels during transmission of the first, second, third and fourth frequencies to determine whether the first, second, third and fourth transducer banks are malfunctioning; and
   a master controller coupled to the processor and configured to provide remote performance monitoring of the first, second, third and fourth transducer banks.

2. The system of claim 1, wherein at least one of the first, second, third or fourth transducer banks generates a different ultrasonic output waveform than the others of the transducer banks.

3. The system of claim 1, wherein at least one of the first, second, third or fourth transducer banks generates an ultrasonic output waveform selected from the group consisting of white noise continuous, white noise pulsed (fixed), white noise pulsed (randomized), single frequency continuous, single frequency pulsed (fixed), single frequency pulsed (randomized), and frequency sweep.

4. The system of claim 1, wherein each of the first, second, third and fourth sets of transducers comprises four transducers.

5. The system of claim 1, wherein the master controller is configured to monitor at least one of an ambient temperature or an error status of the first, second, third and fourth transducer banks.

6. The system of claim 1, wherein the master controller is configured to be connected to a network.

7. The system of claim 6, wherein the master controller is configured to receive one or more control instructions from the network.

8. The system of claim 7, wherein the one or more control instructions are selected from the group consisting of a deterrent box on/off instruction, a system on/off instruction, a transducer bank on/off instruction, and a start/stop instruction.

9. The system of claim 7, wherein the master controller is configured to communicate the one or more control instructions to the processor.

10. The system of claim 6, wherein the master controller is configured to receive a firmware update from the network.

11. The system of claim 1, wherein the first, second, third and fourth transducer banks are disposed in a deterrent box.

12. The system of claim 11, further comprising a mounting device for attaching the deterrent box to a nacelle of the wind turbine, the mounting device comprising:
 a horizontal member;
 at least one vertical member having a first end coupled to the horizontal member and a second end to be coupled to the nacelle of the wind turbine;
 a bracket coupled to the horizontal member, the bracket having a bracket arm that is adjustable in at least two axes; and
 a mounting plate coupled to the bracket arm, the mounting plate for receiving the deterrent box, wherein adjusting the bracket arm adjusts an orientation of the mounting plate.

13. The system of claim 12, further comprising a side bracket having a side arm for attaching the deterrent box on the vertical member.

14. The system of claim 12, further comprising a supplementary support having a first end coupled to the side arm and a second end to be coupled to the nacelle of the wind turbine.

15. The system of claim 1, wherein the master controller is configured to log one or more parameters received from the processor.

16. The system of claim 15, wherein the one or more parameters are selected from the group consisting of a heat sink temperature, an output waveform type, a transducer bank status, and an error status.

* * * * *